United States Patent
Cheriton et al.

(10) Patent No.: US 6,506,246 B1
(45) Date of Patent: Jan. 14, 2003

(54) SETTABLE COMPOSITION

(75) Inventors: Leslie W. Cheriton, Swindon (GB); Anthony C. Plaisted, Swindon (GB); Anthony M. James, Swindon (GB); Judith A. Simcox, Swindon (GB)

(73) Assignee: Fosroc International Limited, Swindon (GB)

(*) Notice: Subject to any disclaimer, the term of this patent is extended or adjusted under 35 U.S.C. 154(b) by 0 days.

(21) Appl. No.: 09/763,888

(22) PCT Filed: Aug. 31, 1999

(86) PCT No.: PCT/GB99/02703

§ 371 (c)(1), (2), (4) Date: Jun. 8, 2001

(87) PCT Pub. No.: WO00/14026

PCT Pub. Date: Mar. 16, 2000

(30) Foreign Application Priority Data

Sep. 2, 1998 (GB) ............................................. 9819066
Sep. 2, 1998 (GB) ............................................. 9819067

(51) Int. Cl.$^7$ ............................................. C04B 28/26
(52) U.S. Cl. ....................................... 106/600; 106/603
(58) Field of Search ................................. 106/600, 603

(56) References Cited

U.S. PATENT DOCUMENTS

| | | | |
|---|---|---|---|
| 4,609,487 A | * 9/1986 | Burkhardt et al. | 106/900 |
| 5,669,968 A | 9/1997 | Kobori et al. | 106/790 |

FOREIGN PATENT DOCUMENTS

EP 0 602 541 6/1994

OTHER PUBLICATIONS

Database WPI § Ch, Week 198313 Derwent Publications Ltd., London, GB: AN 1983–30440K & JP58 026064 A (Toa Gosei Chem Ind Ltd), Feb. 1983.

Patent Abstracts of Japan vol. 014, No. 578 (C–0791), Dec. 1990 & JP02 252642 (Nippon Chem Ind Co Ltd), Oct. 1990.

Patent Abstracts of Japan vol. 005, No. 128 (C–067), Aug. 1981 & JP56 065079 (Nitto Chem Ind Co Ltd), Jun. 1981.

* cited by examiner

*Primary Examiner*—Paul Marcantoni
(74) *Attorney, Agent, or Firm*—Nixon & Vanderhye P.C.

(57) ABSTRACT

A substantially water-free hardener composition suitable for admixture with a cement to give a product capable of reaction with a silicate to form a hardened mass, comprises: (a) from 5 to 99.9%, preferably 75 to 99.8%, of an organic carbonate hardener for the silicate; (b) from 0.01 to 20%, preferably 0.02 to 10% of an organic retarder, preferably an organic acid retarder such as citric acid for the cement, the % being by weight based on the total weight of (a) and (b). The organic carbonate hardener is preferably a mixture of ethylene and propylene carbonates in proportions of from 3:1 to 1:3 by weight. The hardener may include a cement such as Portland cement. Suitable amounts are (a) organic carbonate hardener from 10 to 60%, (b) organic retarder is from 0.05 to 10% and (c) cement from 20 to 85%. The invention also provides a silicate base composition for reaction with the hardener comprising (a) from 40 to 85% of a filler, (b) from 3 to 40% of an alkali metal silicate and (c) from 5 to 70% of water, the percentages being by weight based on the total weight of (a), (b) and (c) and the amount of alkali metal silicate being on a dry basis.

12 Claims, 1 Drawing Sheet

SETTABLE COMPOSITION

This invention relates to a composition which is settable by the reaction of a silicate with a hardener, more particularly to a composition provided in two parts to be mixed, each part formulated to have improved storage stability. When the parts are mixed the composition is useful for a variety of purposes for example anchoring anchor elements in the roof of a mine to secure the roof strata to overlying rock formations.

It has been previously proposed to provide hardenable silicate compositions in two part form and this is described in U.S. Pat. No. 5,165,958 which describes a method of sealing mine stoppings where an alkali metal silicate solution provided in one part is gelled by reaction with a weak acid or acid salt or ester that hydrolyses to release acid provided in another part. U.S. Pat. No. 5,330,785 describes the use of a similar two part composition to seal rock strata.

It is a problem with two part settable silicate compositions that they have only a limited shelf life, especially when they are stored under very hot or humid conditions which are sometimes found in mines.

A solution to this problem has now been invented in which the two parts of the settable silicate composition have an improved shelf life.

According to one aspect of the present invention there is provided a substantially water-free hardener composition suitable for admixture with a cement to give a product capable of reaction with a silicate to form a hardened mass, said hardener composition comprising:

(a) from 50 to 99.9% of an organic carbonate hardener for the silicate (b) from 0.01 to 20% of an organic retarder preferably an organic acid retarder for the cement, the % being by weight based on the total weight of (a) and (b).

Preferably the amount of carbonate is from 75 to 99.8% and the amount of organic acid retarder is from 0.02 to 10%.

The carbonate may conveniently be ethylene carbonate, propylene carbonate, or butylene carbonate and is preferably a dry blend of ethylene carbonate (which is a solid at room temperature) in liquid propylene carbonate.

Preferably the organic carbonate hardener is a mixture of ethylene and propylene carbonates in proportions of from 3:1 to 1:3 by weight.

The hardener composition preferably includes a cement.

Therefore according to a preferred embodiment of the invention a hardener composition for reaction with a silicate to form a hardened mass, comprises:

a) from 10 to 60% of an organic carbonate hardener for the silicate b) from 0.05 to 5% of an organic retarder preferably an organic acid retarder for the cement and (c) from 20 to 85% of a cement capable of reacting with the silicate, the % being by weight based on the total weight of (a), (b) and (c).

By adjusting the amounts of (a), (b) and (c) it is possible to form the composition as a stable paste ie where the solids do not settle out and also to achieve a storage life of at least 12 weeks at 35 degrees Centigrade.

Preferably the blend of carbonates makes up about 20% to about 40%, most preferably about 25–35% by weight of the water free hardener composition.

In addition to the carbonate other organic hardeners for silicates may be employed, e.g. AGS esters, triacetin, diacetin; and the like.

It has been found experimentally that ethylene carbonate, propylene carbonate and buylene carbonates result in different gel times. In the case of ethylene carbonate alone the gel time is about 15 seconds whereas with buylene carbonate it is about 20 minutes. By emptying a mixture and adjusting the proportions of these carbonates it is possible to adjust the gel time between about 5 seconds and 20 minutes.

It was initially expected that a dry mixture of organic carbonate and cementitious material would be stable but it was found by experiment to harden after about 3 weeks at 35° C. However it was then found unexpectedly that the addition of an organic acid known as a retarder for the reaction of cements with water, produced a stable composition that was usable after storage for 12 weeks at 35° C.

The cement is preferably Ordinary Portland Cement (OPC) which makes up the major constituent. Other cements may also be present in addition to, or in substitution for the OPC, e.g. calcium sulphoaluminate (CSA, high alumina cement (HAC), plaster, ground granulated blast furnace slag (GGBFS), pulverised fuel ash (PFA) and the like.

The hardener composition may include other ingredients, for example, suspension agents such as bentonite, say up to 10%; retarders; extenders; accelerators; dispersants; and the like.

According to another aspect of the invention there is provided a silicate-containing composition for reaction with the hardener composition to form a hardened mass, said silicate composition comprising:

a) from 50 to 85%, preferably 50 to 80% of a filler, (b) from 3 to 40%, preferably 5 to 25% of an alkali metal silicate (c) from 5 to 70%, preferably 10 to 50% water the percentages being by weight based on the total weight of (a), (b) and (c) and the amount of alkali metal silicate being on a dry basis.

By adjusting the amounts of (a), (b) and (c) it is possible to produce the composition in the form of a stable paste ie where the solids do not settle out and also to achieve a storage life of at least 12 weeks at 35 degrees centigrade.

The composition may include other inorganic settable substance; fillers; and the like. Preferably the composition includes an orthophosphate to act as retarder and/or dispersant; accelerators; extenders; and the like.

The silicate may be an alkali metal silicate for example sodium or potassium silicate and may have a silica to alkali metal oxide molar ratio of from 2: to 4:1. Alkali metal silicates are usually associated with water and the silicate may have a solids content of from 10 to 60% by weight, typically about 30 to 50%, the balance being water.

References to the amount of alkali metal silicate in the silicate base composition are calculated on a water-free basis.

The silicate-containing composition may contain a filler provided it is non reactive and compatible with the silicate for long term stability. Such fillers include limestone, mica, cellulose fibre, glass fibre, and other reinforcing non reactive fibres, clay and kaolin.

It is an object of the invention to prolong the shelf life of the silicate base composition as well as that of the hardener composition. Generally the lower the molar ratiof silica to sodium oxide the shorter is the shelf life. When the molar ratio is raised to about about 3.3:1 the shelf life is extended but the gel time is too short. However it has been discovered that if the molar ratio of silica to alkali metal oxide in a silicate is lowered from for example 3.3:1 to about 2.8:1 by the addition of sodium hydroxide or the like the gel time is extended without loss of shelf life.

For example, adding sufficient sodium hydroxide to sodium silicate having a molar ratio of silica: sodium oxide of 3.3:1 to give a molar ratio of 2.8:1 gives a shelf life greater than 12 weeks at 35° C.

According to one embodiment of the invention there is provided a compartmented container having two compartments impervious to air and water, one compartment containing a hardener composition as hereinbefore defined and the other compartment containing a silicate-containing composition as hereinbefore defined.

The relative amounts of amounts of reactive components are preferably chosen so that when the compositions in the two compartments are mixed the reactants will form a hardened mass.

Conveniently the relative amounts of ethylene carbonate, propylene carbonate and butylene carbonate are adjusted to give a gel time of within 15 seconds and 20 minutes.

The invention includes a method of reacting the two part composition for purposes other than anchoring an anchor element.

The cement may contain traces of moisture such as are found in commercially available forms of these materials and references to dry and substantially water-free should be construed accordingly.

In order that the invention may be well understood it will now be described, by way of illustration only, with references to the following examples in which parts are by weight and strengths are in MPa.

EXAMPLE I

Figure 1:
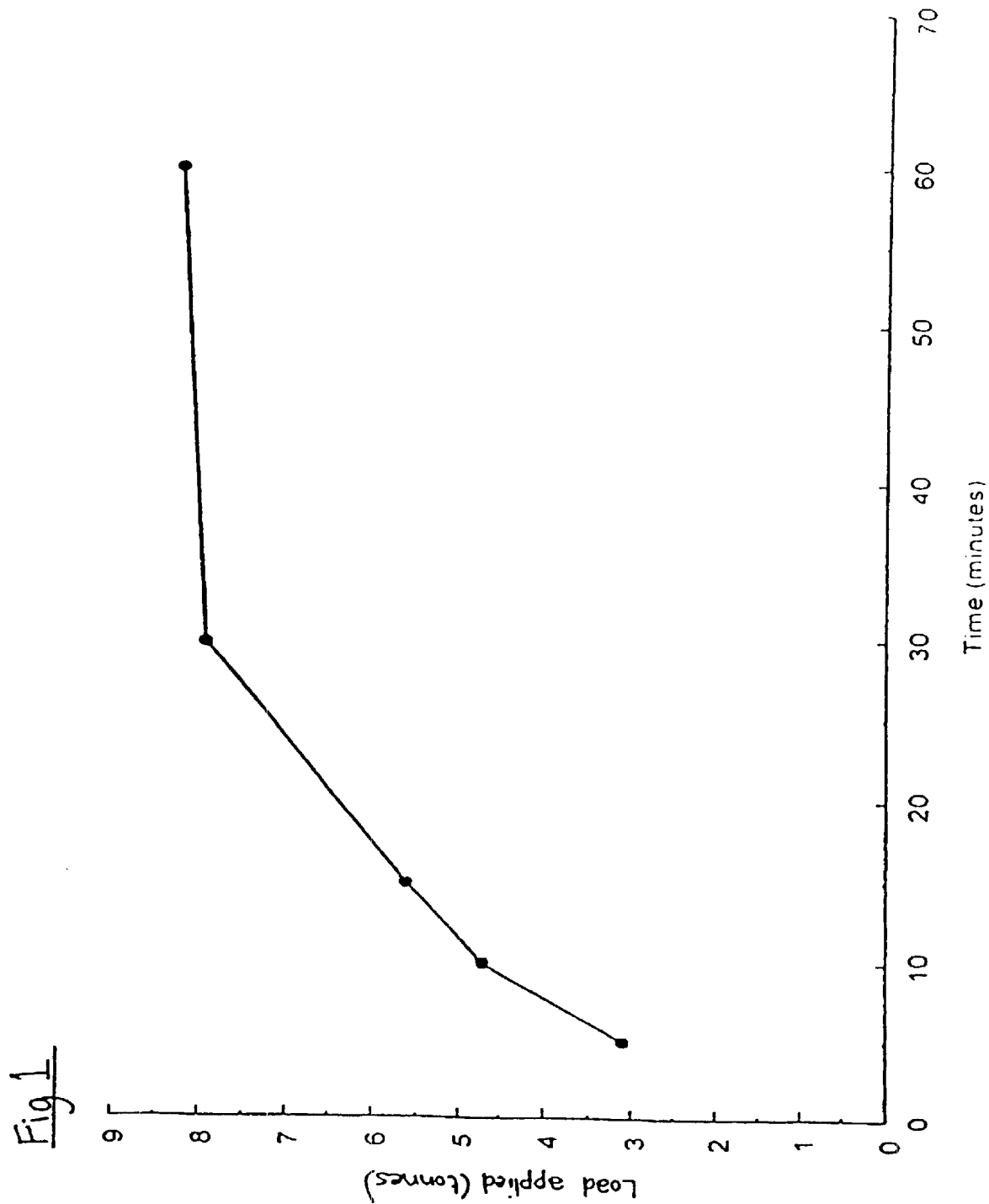
FIG. 1 is a graph showing the load applied (tonnes) versus time (minutes) for the settable compositions in accordance with the present invention.

A silicate base composition and a dry hardener composition were prepared and stored separately. The ingredients used to prepare the two compositions are set out below:

| SILICATE BASE | % by weight |
|---|---|
| Graded limestone filler | 66.5 |
| sodium silicate* (SiO$_2$: Na$_2$O ratio 3.3:1) | 27.0 |
| tri-sodium orthophosphate retarder** | 1.0 |
| sodium hydroxide powder*** | 0.5 |
| china clay | 5.0 |

*solids content 38.1% by weight, the remainder being water. Weight % of sodium silicate calculated on a water free basis was 10.29%.
**also acts as a dispersion agent for the limestone and silicate.
***sodium hydroxide added to adjust the molar ratio to about 2.8:1

The silicate base was prepared by adding to the sodium silicate (which was a clear liquid) the sodium hydroxide powder and the sodium orthophosphate and mixed until dissolved. Then the limestone and china clay were added and the stirred in a mixer to form a paste. The paste was stable in that the components did not settle out.

The silicate base composition was stored in an airtight plastic container for 12 weeks at 35° C. after which time it was inspected and found to be useable, thus demonstrating a shelf life of at least 12 weeks under these conditions.

| HARDENER | |
|---|---|
| Ordinary Portland Cement | 67.8 |
| propylene carbonate* and ethylene carbonate (50:50 blend by weight) | 30.0 |
| bentonite suspending agent | 2.0 |
| citric acid | 0.2 |

*the organic carbonates employed were polyurethane grade materials ie extremely dry.

The hardener composition was prepared by adding the citric acid to the mixture of ethylene and propylene carbonate and stirring until dissolved. Then the ordinary Portland cement and bentonite were added and mixed to form a paste. The paste was stable in that the components did not settle out.

The above hardener composition was stored in an airtight plastic container for 12 weeks at 35° C. after which time it was inspected and found to be useable, thus demonstrating a shelf life of at least 12 weeks under these conditions.

It was expected that the dry mixture of cement and carbonates would be stable but it was found to set after about 3 weeks storage. The addition of citric acid produced a stable composition. It was surprising that the citric acid (which has previously been used as a retarder when water is employed to set the cement) was effective in stabilising the components in a dry system.

When the two compositions are mixed the main reactions are firstly between the carbonate with the silicate and secondly between the cement and the water associated with the silicate. In addition the Portland cement being highly alkaline will act as a gelling agent for the silicate.

The base and hardener were mixed in a weight ratio of 9:1 and the composition gelled within about 90 seconds. Different samples were made and tested under different conditions of cure.

The following results were obtained:

The dry tests were carried out by mixing the silicate base and hardener and adding the mixture to a mould and allowing the mixture to set in the mould. The samples were then demoulded and allowed to stand in the air in the laboratory.

| Time | Strength |
|---|---|
| DRY CURE AT 20° C. | |
| 30 mins | 11.8 |
| 1 hour | 12.2 |
| 1 day | 14.3 |
| 7 days | 23.5 |
| 28 days | 32.4 |
| DRY CURE AT 35° C. | |
| 1 day | 15.0 |
| 7 days | 20.3 |
| 28 days | 28.4 |
| DRY CURE AT 50° C. | |
| 1 day | 21.0 |
| 7 days | 29.6 |
| 28 days | 32.6 |

The wet cure samples were demoulded after one hour, placed under water and then tested.

| Time | Strength |
|---|---|
| WET CURE AT 20° C. | |
| 1 day | 12.5 |
| 7 days | 20.5 |
| 28 days | 21.0 |
| WET CURE AT 35° C. | |
| 1 day | 12.8 |
| 7 days | 18.6 |
| 28 days | 19.0 |
| WET CURE AT 50° C. | |
| 1 day | 11.1 |
| 7 days | 16.9 |
| 28 days | 17.3 |

These results show that at different storage conditions of humidity and temperature the composition could still be set to provide high early and long term compressive strength. The advantages of the compositions illustrated in the above Example are:

(i) both compositions are stable pastes in that the solids do not settle out which makes them suitable for use in a two part capsule of the type used in mining operations (ii) both compositions have a storage life of at least 12 weeks when stored at 35 degrees Centigrade.

(iii) the carbonates serve as a carrier for the cement and the water serves as a carrier for the silicate and in addition the carbontes react with the silicate and the water with the cement. Thus each carrier, whilst inert in its composition, will when mixed react with a component in the other composition.

EXAMPLE II

A roof bolt of 20 mm diameter was anchored in a hole which was 28 mm in diameter and 229 mm in depth using a composition according to Example I and the load applied was measured over time. The results are shown in the graph of the accompanying FIG. 1 from which it will be seen that the load increased with time and stabilised after 30 minutes. The early high strength is useful in anchoring.

The invention is not limited to the examples: for instance different cements and fillers may be used and in different proportions: the carbonate hardener may be butylene carbonate either alone or in combination with other hardeners.

EXAMPLE III

The silicate base and hardener compositions of example 1 were packed into separate compartments of a capsule having two compartments made of tri-laminate film at a ratio by weight of 9 parts silicate base to 1 part hardener. Three 24 mm diameter, 450 mm long capsules were made. These were pneumatically inserted into a 1.85 m deep, 28 mm diameter hole in a Polish copper mine. A 20 mm rebar was spun through the capsules to break the film and mix the contents. 10 minutes after installation the anchor was found to exceed the anchoring requirements of the Polish regulations for copper mines. These regulations state that the bolt must be capable of taking a load of greater than 10 tonnes 10 minutes after installation with a maximum movement of 10 mm.

What is claimed is:

1. A two part hardenable silicate material having a first part being a substantially water-free hardener composition, said hardener composition comprising:

(a) from 10% to 60% of an organic carbonate hardener for the silicate (b) from 20% to 85% of a cement hardenable by reaction with water and (c) from 0.05% to 10% of a retarder for the cement, the % being by weight based on the total weight of (a), (b) and (c) and the material having a second part being a silicate-containing composition comprising, (i) from 40% to 85% of a filler (ii) from 3% to 40% of an alkali metal silicate and (iii) from 5% to 70% of water, wherein
the percentages being by weight based on the total weight of (i), (ii) and (iii) and the amount of silicate being on a dry basis and wherein the relative amounts of the reactants are such that when the parts are mixed, the reactants will form a hardened mass.

2. A hardenable silicate material as claimed in claim 1, wherein the organic carbonate hardener is selected from the group consisting of ethylene carbonate, propylene carbonate, and butylene carbonate.

3. A hardenable silicate material as claimed in claim 1, wherein the organic carbonate is a mixture of ethylene and propylene carbonates in proportions of from 3:1 to 1:3 by weight.

4. A hardenable silicate material as claimed in claim 1, wherein the first part contains organic carbonate hardener in an amount from 15 to 50%, cement from 40 to 75% and retarder from 0.1 to 4%.

5. A hardenable silicate material as claimed in claim 1, wherein the cement in the first part is Portland cement.

6. A hardenable silicate material as claimed in claim 1, wherein the hardener composition further comprises (d) from 0.05 to 10% of an agent for assisting the suspension of the solids in the organic carbonate, the % being based on the total weight of (a), (b), (c) and (d) and where the amounts of which provide a stable paste.

7. A hardenable silicate material as claimed in claim 1, wherein the silicate-containing composition comprises:

from 50 to 80% of a filler from 5 to 25% of an alkali metal silicate and from 10 to 50% of water.

8. A hardenable silicate material as claimed in claim 1, wherein the relative amounts of (i), (ii) and (iii) provide a stable paste.

9. A hardenable silicate material as claimed in claim 1, wherein the filler is a mineral in solid particulate form.

10. A hardenable silicate material as claimed in claim 1, wherein the organic carbonate is selected from ethylene carbonate, propylene carbonate, and butylene carbonate, the relative amounts of which achieve a gel time of within 5 seconds to 20 minutes.

11. A hardenable silicate material as claimed in claim 1, wherein the two parts are contained in separate compartments of a compartmented container having two compartments impervious to air and water.

12. A method of forming a hardened mass by reaction of a silicate with an organic carbonate hardener which method comprises mixing a silicate-containing composition comprising (i) from 40 to 85% of a filler (ii) from 3 to 40% of an alkali metal silicate (iii) from 5 to 70% of water the percentages being by weight based on the total weight of (i), (ii) and (iii) and the amount of silicate being on a dry basis with a hardener composition comprising, (a) from 10 to 60% of an organic carbonate hardener for the silicate (b) from 20 to 85% of a cement hardenable by reaction with water (c) from 0.05 to 10% of a retarder for the cement, the % being by weight based on the total weight of (a), (b) and (c).

* * * * *